INVENTOR.
WALTER O. STANTON
BY
Kane, Dalsimer and Kane
ATTORNEYS

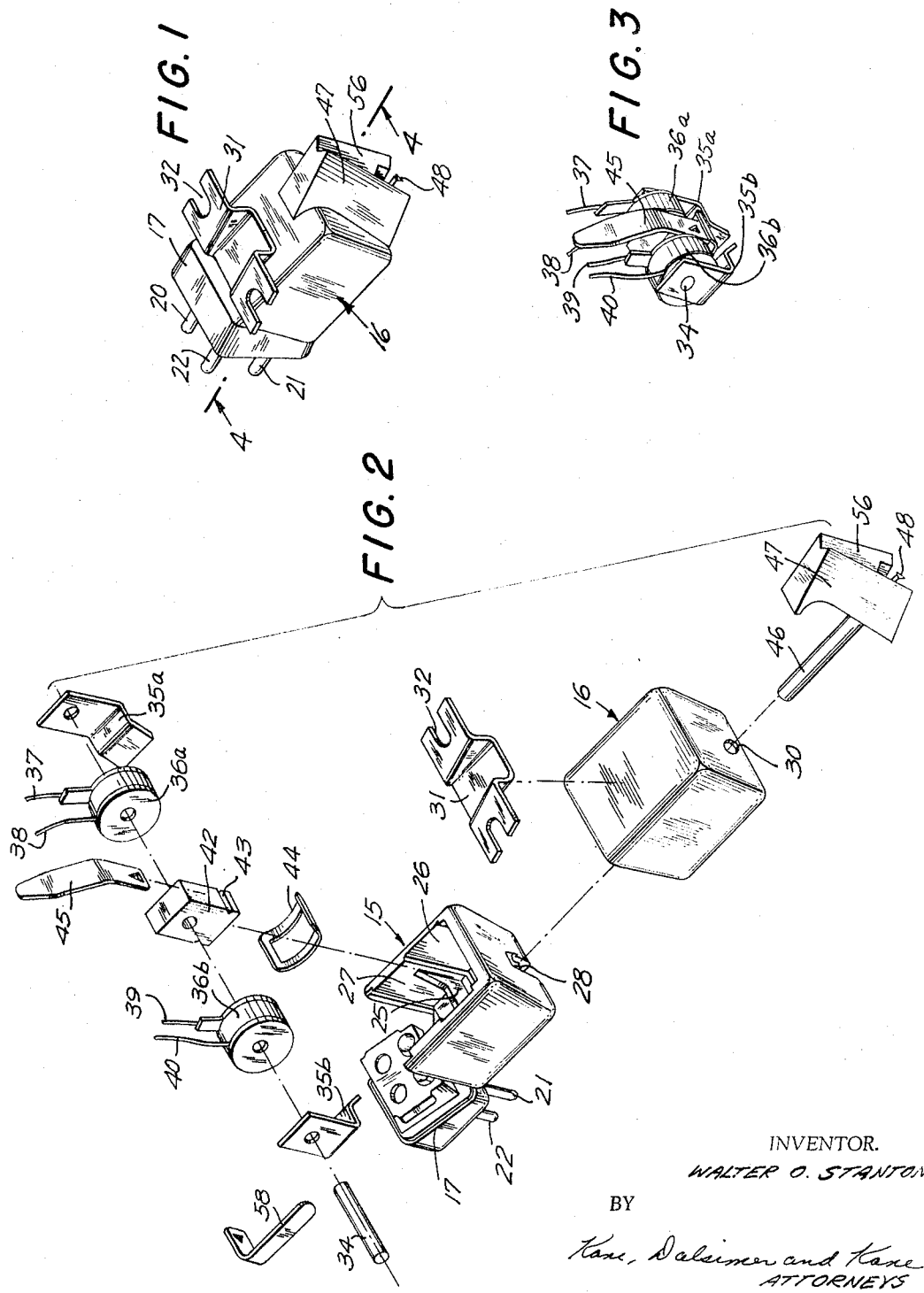

Jan. 10, 1967   W. O. STANTON   3,297,831
MAGNETIC STEREOPHONIC PHONOGRAPH PICKUP
Filed Feb. 6, 1964   10 Sheets-Sheet 3

INVENTOR.
WALTER O. STANTON
BY
Kane, Dalsimer and Kane
ATTORNEYS

Jan. 10, 1967  W. O. STANTON  3,297,831
MAGNETIC STEREOPHONIC PHONOGRAPH PICKUP
Filed Feb. 6, 1964  10 Sheets-Sheet 4
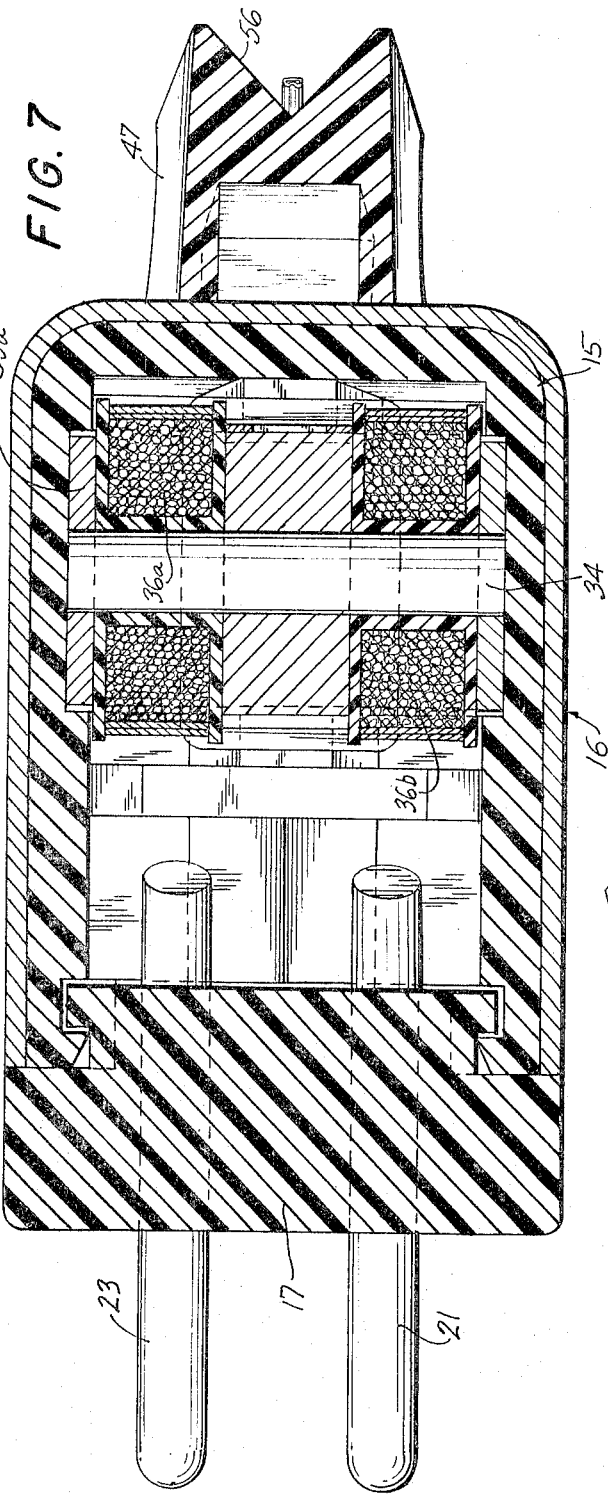
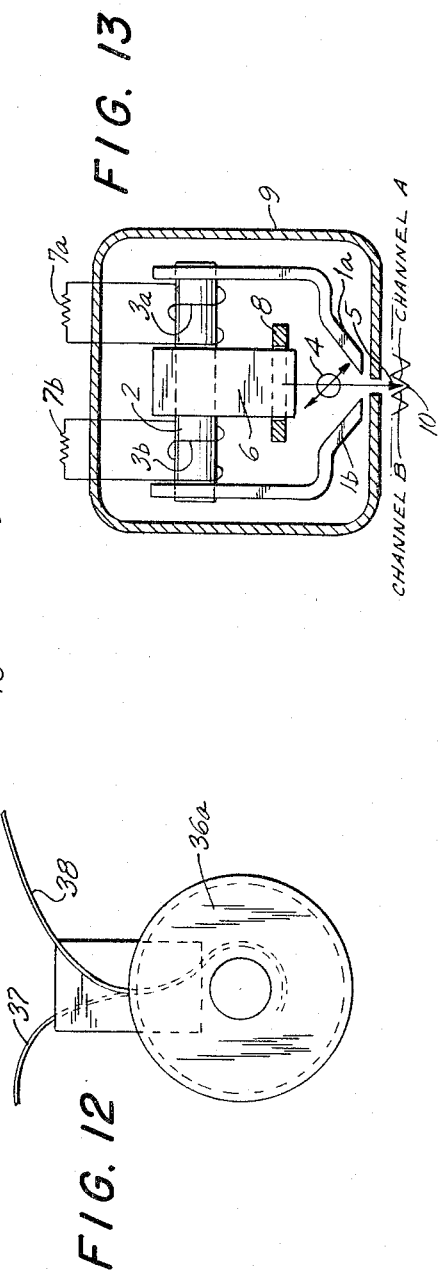
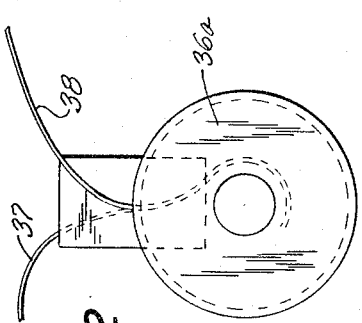
INVENTOR.
WALTER O. STANTON
BY
Kane, Dalsimer and Kane
ATTORNEYS Jan. 10, 1967 W. O. STANTON 3,297,831
MAGNETIC STEREOPHONIC PHONOGRAPH PICKUP
Filed Feb. 6, 1964 10 Sheets-Sheet 5

INVENTOR.
WALTER O. STANTON
BY
Kane, Dalsimer and Kane
ATTORNEYS

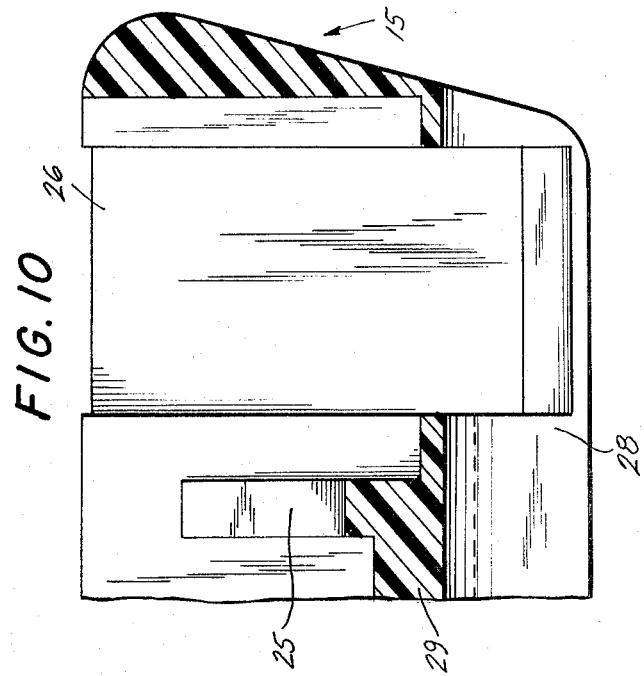
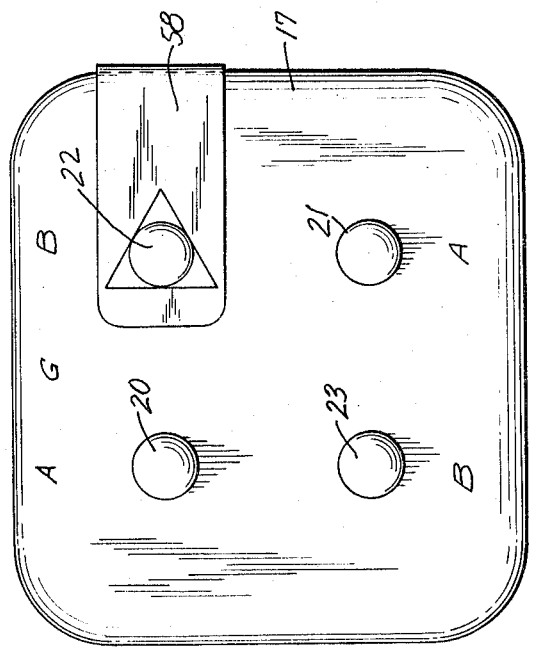
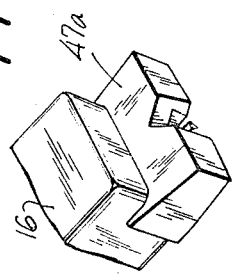
INVENTOR.
WALTER O. STANTON
BY
Kane, Dalsimer and Kane
ATTORNEYS Jan. 10, 1967 W. O. STANTON 3,297,831
MAGNETIC STEREOPHONIC PHONOGRAPH PICKUP
Filed Feb. 6, 1964 10 Sheets-Sheet 7
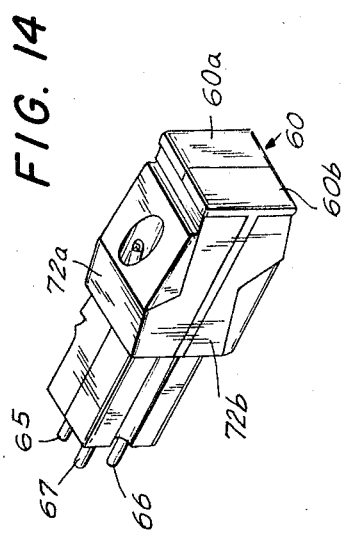
INVENTOR.
WALTER O. STANTON
BY
Kane, Dalsimer and Kane
ATTORNEYS

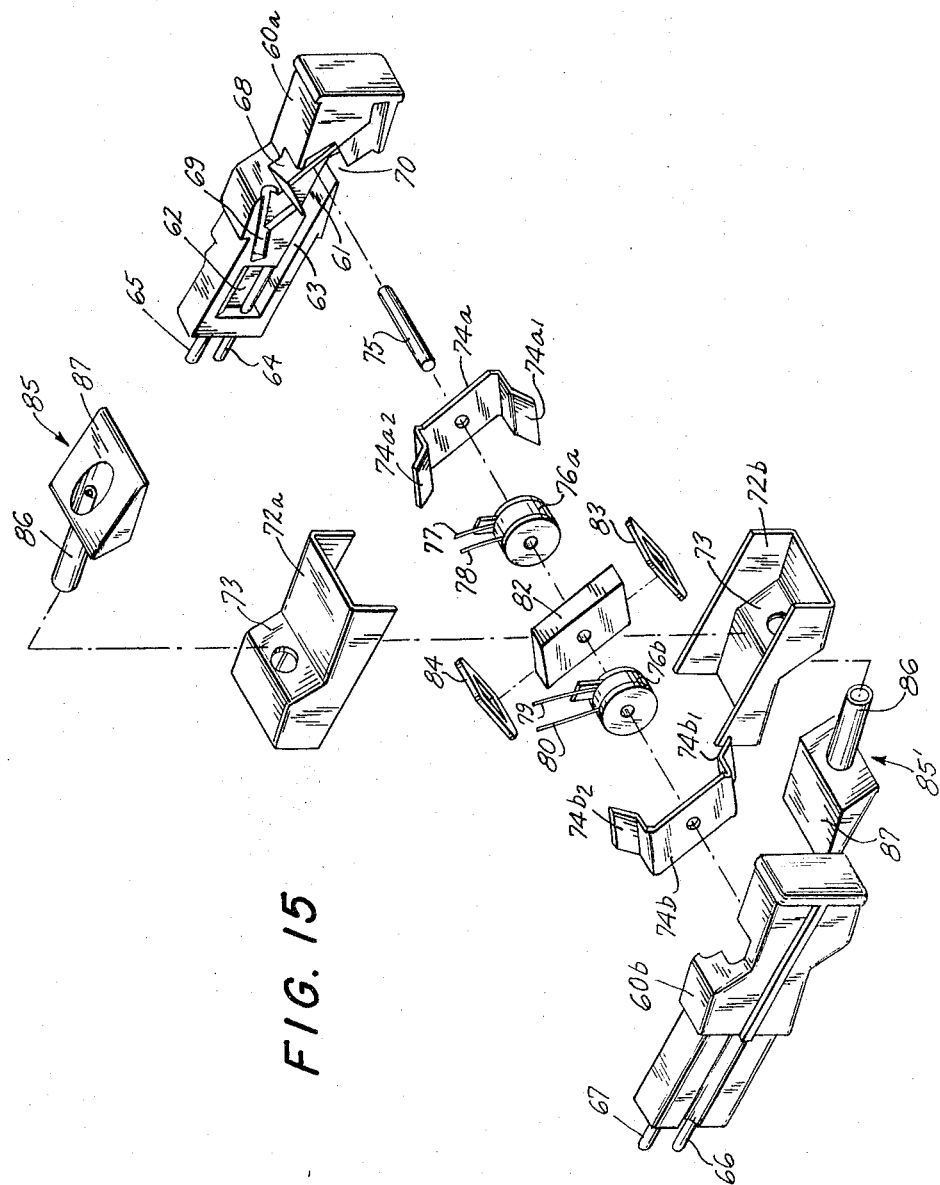

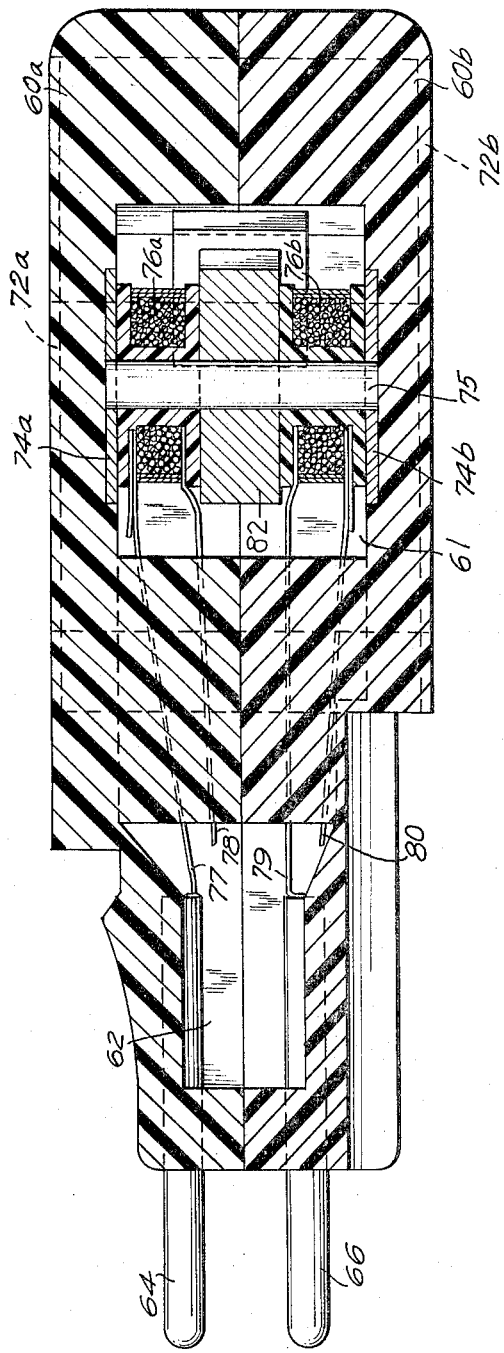

United States Patent Office 3,297,831
Patented Jan. 10, 1967

3,297,831
MAGNETIC STEREOPHONIC PHONOGRAPH
PICKUP
Walter O. Stanton, Laurel Hill Road, Laurel Hollow,
Long Island, N.Y. 11948
Filed Feb. 6, 1964, Ser. No. 342,885
14 Claims. (Cl. 179—100.41)

This invention relates to an improved stereophonic phonograph record pickup of the magnetic type.

Magnetic phonograph pickups have recognized advantages in fidelity and response characteristics over pickups of other types, such as piezo-electric or crystal type of pickups. However, magnetic pickups of the stereophonic type, while presenting these advantages over other types of pickups, have nevertheless been confronted with certain difficulties and problems.

Thus, stereophonic pickups of the magnetic type have generally required two complete magnetic circuits, including at least two pairs of pole pieces, at least two cores, and at least two sets of interconnecting magnetic circuit portions. This has resulted in increased bulk and mass and also increased cost of parts and assembly.

Furthermore, in certain types of magnetic stereophonic pickups, difficulty has been encountered in maintaining a clear line of demarcation between the active channel and the so-called quiet channel, and undesirable cross-talk between the channels has resulted.

It is an object of the present invention to overcome the difficulties and disadvantages heretofore encountered and to provide an improved magnetic phonograph pickup of the stereophonic type having a minimum number of parts which may be readily assembled together thereby reducing the bulk and mass of the pickup and decreasing the cost of manufacture and assembly.

A further object is the provision of an improved stereophonic magnetic pickup which not only provides high fidelity and response characteristics, but also provides a high degree of control over the demarcation between the active and quiet channels to thereby substantially eliminate or minimize cross-talk between the channels.

Among other objects of my invention, is the provision of an improved stereophonic magnetic pickup in which the casing and parts are so designed as to facilitate the assembly thereof and which is of relatively simple and inexpensive construction having a minimum number of parts which will give satisfactory performance over a relatively long period of time with comparative freedom from wear.

My invention contemplates the provision of an improved stereophonic magnetic pickup of simplified construction in which a pair of proximately spaced pole pieces are connected to respectively opposite end portions of core means on which a pair of current generating coils are mounted in spaced relationship. A moving system including a stylus and a permanent magnet are supported between the pole pieces for oscillatory movement so that a pole of the magnet can move in paths towards and away from the respective pole pieces. A magnetic compensator extends from the core means between the coils towards the permanent magnet to provide a magnetic path between the core means and the magnet. Thus, when the magnet moves in a path towards and away from one of the pole pieces to energize the coil of the active channel there will be no drop or change in magneto-motive force and flux across the coil of the quiet channel with the result that no current is generated therein.

My invention also contemplates the provision of a phase compensator in the form of a coil disposed around the magnetic compensator to compensate for phase shifts due to the load current in the active channel.

I may also utilize the shielding forming part of the casing to further help compensate the magnetic circuit and to help prevent or minimize magneto-motive force or flux across the coil of the quiet channel. For this purpose the shielding is extended into inductive relationship with respect to the pole pieces.

In the accompanying drawings:

FIG. 1 is a perspective view of a magnetic stereophonic cartridge embodying my invention;

FIG. 2 is an exploded view showing the several parts making up the pickup cartridge of FIG. 1;

FIG. 3 is a perspective view of the sub-assembly of core means, pole pieces and current generating coils;

Figure 4:
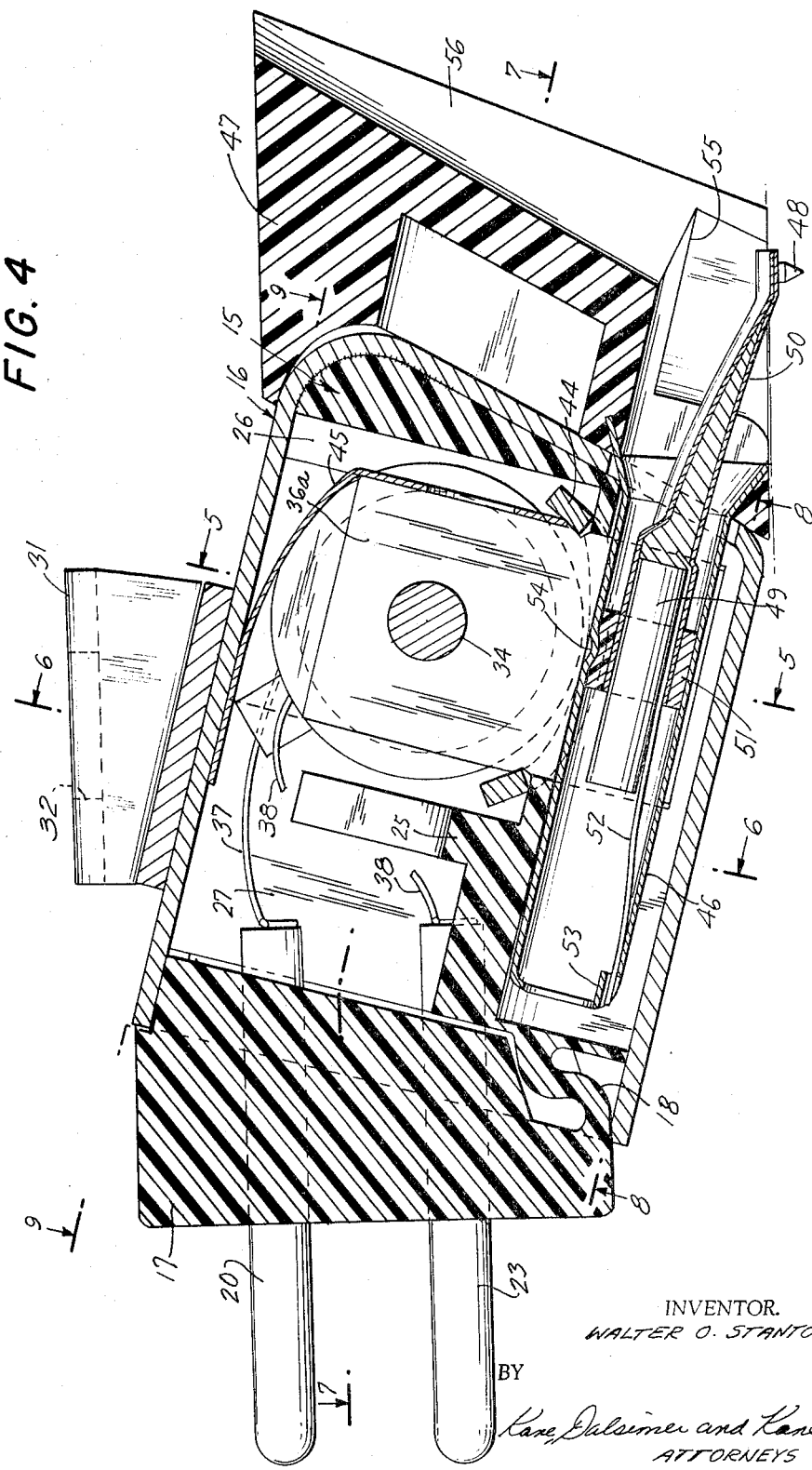
FIG. 4 is a longitudinal, sectional view on an enlarged scale in the direction of the arrows on the line 4—4 of FIG. 1.
Figure 6:
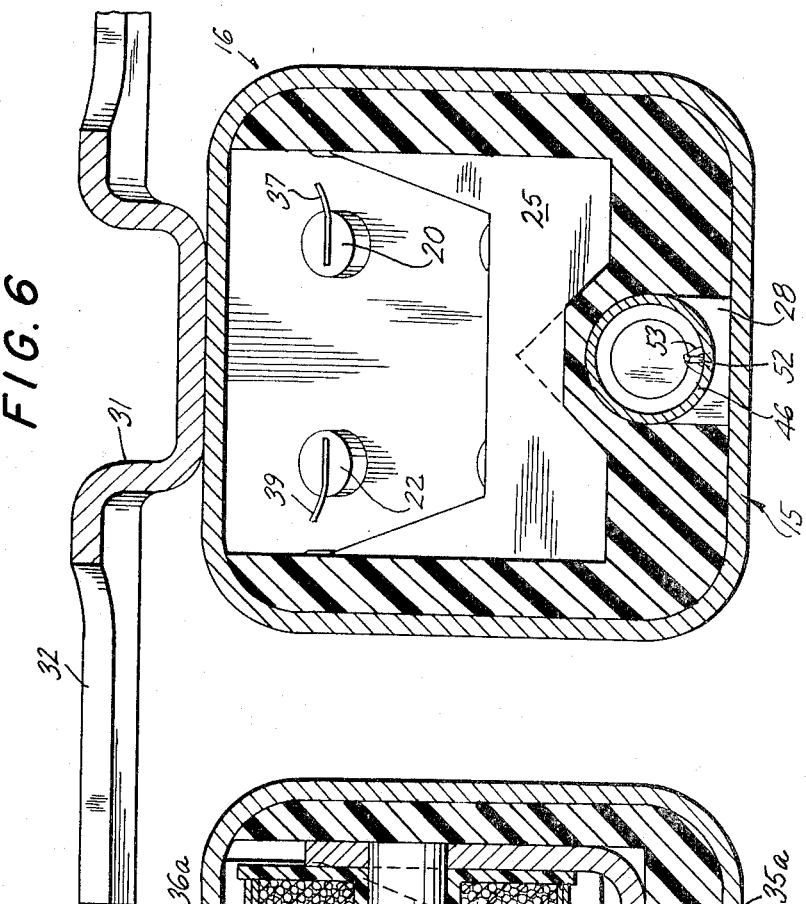

FIGS. 5, 6, 7, 8 and 9 are sectional views in the direction of the arrows respectively on the lines 5—5, 6—6, 7—7, 8—8 and 9—9 of FIG. 4;

FIG. 10 is a fragmentary, sectional view showing a portion of the casing supporting and containing the pole pieces, core means and current generating coils of my improved pickup;

FIG. 11 is an elevational view of the back end of the pickup showing the contact prongs;

FIG. 12 is a side elevational view of one of the current generating coils of my improved pickup;

FIG. 12A is a perspective view of a pickup embodying my invention similar to that shown in FIGS. 1 to 12 but having a modified form of plastic handle applied to the moving system.

Figure 16:
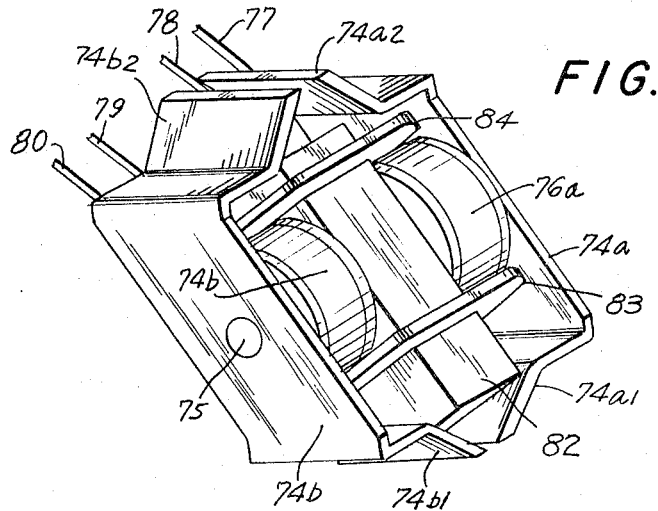
Figure 18:
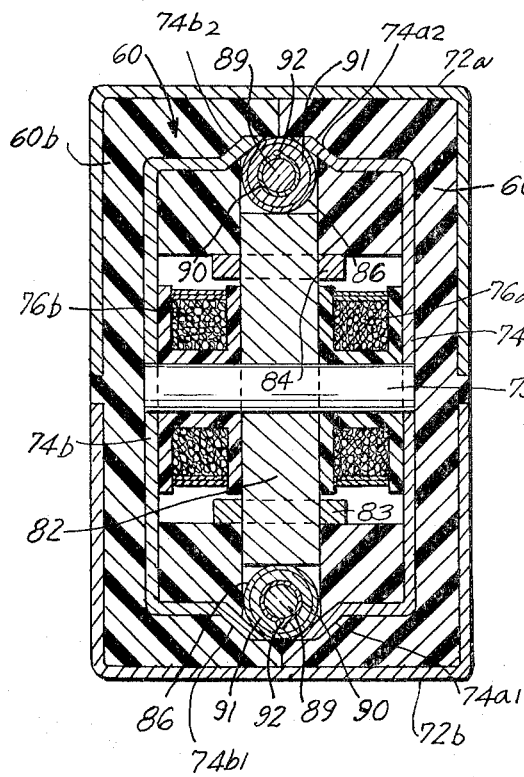

FIG. 13 is a diagrammatic view in simplified form illustrating the principle of operation of my pickup;

FIG. 14 is a perspective view of a modified form of pickup having two separate stylus assemblies or moving systems on opposite sides of the pickup cartridge;

FIG. 15 is an exploded view showing the several parts making up the pickup cartridge shown in FIG. 14;

FIG. 16 is a perspective view of the sub-assembly of pole pieces, core means and current generating coils used in the pickup cartridge of FIG. 14;

FIG. 17 is a longitudinal, sectional view of the pickup cartridge shown in FIG. 14; and FIGS. 18 and 19 are sectional views in the direction of the arrows respectively on lines 18—18 and 19—19 of FIG. 17.

My invention provides for the production of a pickup cartridge of simplified design having a minimum number of parts which can be readily assembled together. It also provides for improved performance due to the ready control of all significant variables.

The principle upon which my invention operates is illustrated diagrammatically in FIG. 13 and a fuller understanding and appreciation of the invention will be obtained by first referring to this figure.

A cross section of a record groove in exaggerated or in enlarged form is shown at 10. This is a stereophonic record groove of the 45°—45° type with each side representing one of the sound channels. Thus, one side of the record groove is designated as channel A and the other side is designated as channel B. Each side is separately modulated with the sound coming from the corresponding sound channel.

My improved pickup has a record engaging stylus shown at 5 which may be a jewel, such as a diamond, which is mounted on a suitable supporting structure including a permanent magnet shown at 4, mounted for oscillatory movement so that one of the poles of the magnet can move in paths towards and away from the respective pole pieces in response to the modulations of the channels of the record groove.

The magnetic circuit is completed through pole pieces 1a and 1b, representing respectively the two channels of the system, which are connected to the opposite end portions of the core means 2. The pole pieces and the core means are made of magnetic material, preferably of high magnetic permeability, such as iron, nickel or alloys thereof. The core means preferably takes the form of a cylindrical rod as shown.

Mounted adjacent the opposite ends of the core means are the current generating coils, 3a and 3b respectively. Coil 3a is the current generating coil for channel A and coil 3b is the current generating coil for channel B.

It will be appreciated that when a pole of permanent magnet 4 is caused to move in the direction of the arrows shown in FIG. 13 in response to modulations of channel A of the record groove, a magneto-motive force and flux drop is caused across coil 3a with the result that a voltage is generated therein, and this may be utilized for developing the sound output of channel A.

It will also be appreciated that it is undesirable to cause any similar or substantial magneto-motive force or flux drop across coil 3b in response to movement of the pole of the permanent magnet along the path indicated by the arrows in FIG. 13, as this would result in cross-talk. In order to prevent such magneto-motive force or flux drop from occurring across coil 3b in response to such motions of the pole of the magnet, I provide a magnetic compensator 6 mounted on the core 2 intermediate the current generating coils 3a and 3b. The magnetic compensator is made of magnetic material, preferably having high permeability and it extends from the core towards the permanent magnet 4 forming a flux path between the core and the permanent magnet.

The permanent magnet has two poles at opposite ends and is mounted at an intermediate point so that when one pole moves toward the pole piece, the opposite pole moves toward the magnetic compensator and vice versa. Thus, when a pole of the permanent magnet 4 moves in the direction of the arrows in FIG. 13 in response to modulations of channel A of the record groove, substantially no magneto-motive force or flux drop will occur across current generating coil 3b of channel B. Similarly, when a pole of the magnet 4 moves towards and away from pole piece 1b in response to modulations of channel B of the record groove, a magneto-motive force or flux drop will occur across current generating coil 3b and substantially no magneto-motive force or flux drop will occur across coil 3a.

Further compensation of the magnetic circuit may also be obtained by means of the magnetic shielding 9, which is disposed around the pickup assembly. The shielding performs its usual function of preventing stray currents or magnetic fields from interfering with the output of the pickup. In addition, the shielding may be extended into inductive relationship with respect to the pole pieces 1a and 1b to provide further magnetic compensation and to help prevent or minimize cross-talk between the channels.

In FIG. 13, I have indicated resistances 7a and 7b connected in circuit with the current generating coils 3a and 3b. These symbolically illustrate the load imposed upon the circuits when the pickup is connected to a preamplifier or amplifier system. I have found that when a load is thus imposed upon the active channel there is a phase shift which is fed back to the magneto-motive force or flux in the magnetic circuit, thereby interfering with the compensation of the circuit and resulting in cross-talk. In order to compensate for this phase shift and to prevent or minimize cross-talk, I provide a phase compensator in the form of a closed circuit coil or ring indicated at 8 disposed around the magnetic compensator 6. The phase compensator should be made of a nonmagnetic material which is electrically conducting, and I have found that copper, bronze, brass or similiar materials serve very satisfactorily. Optimum results are achieved in preventing or minimizing cross-talk resulting from phase shift by designing the phase compensator 8 so that its impedance triangle is similar in a geometric sense to the impedance triangle of the load circuit.

Thus, it will be seen that control of the significant variables can be obtained by a number of different mechanisms, i.e., by means of the magnetic compensator 6, by means of the phase compensator 8, and by means of varying the arrangement of the magnetic shielding 9. Other factors may also be utilized in obtaining full control and compensation with respect to the significant variables. Thus, the shape of the outer end of the magnetic compensator 6 may be varied. Thus, it may have a straight or flat outer edge surface as shown, or it may be V-shaped and the angle of the two sides of the V-notch may be varied. Additionally, it may be concavely arcuate or convexly arcuate. Similarly, the angle of the two pole pieces 1a and 1b may be varied with respect to each other.

In the commercially available 45°—45° stereophonic records the sides of the groove are normally disposed at an angle of 90° to each other and each of the sides are disposed at an angle of 45° to the transverse axis of the record. I have found where the end surface of the compensator 6 is flat or straight as illustrated, then better compensation is obtained if the pole pieces 1a and 1b are disposed at an angle greater than 90° to each other, i.e., in the order of 100° or 110° to each other.

Similarly, variations in control may be obtained by bringing the end portions of the shielding 9 into closer or more distant relationship with respect to the pole pieces 1a and 1b.

The permanent magnet is pivotally mounted at an intermediate point, as previously indicated, so that as one pole moves toward a pole piece, the opposite pole moves toward the compensator and vice versa. Further variations in control may be obtained by varying the pivotal point of the permanent magnet with respect to the pole pieces.

Each of these control factors may be utilized and varied to obtain a maximum output in the active channel while minimizing or preventing any response in the so-called quiet channel.

Thus, it will be seen from the diagram of FIG. 13, that I have provided an improved stereophonic pickup of the magnetic type of simplified construction, having a minimum number of parts and which is relatively inexpensive to manufacture and assemble and which furthermore gives improved performance with little or no cross-talk.

While FIG. 13 diagrammatically illustrates the principle of my invention, in FIGS. 1 to 12 I have illustrated one specific embodiment of my invention in the form of a pickup cartridge of the single-sided type, and in FIGS. 14 through 19 I have illustrated a further embodiment of my invention of the double-sided type. In both of the illustrated forms of my invention, I have provided a supporting structure, a magnetic circuit, a current-generating system, a moving system, a magnetic compensator, and a phase compensator.

In the form of pickup cartridge shown in FIGS. 1 to 12 inclusive, the supporting structure comprises a plastic casing 15 and a shielding casing 16 disposed around the exterior of the major portion of the cartridge and the magnetic assembly contained therein.

The plastic casing 15 is preferably molded or otherwise formed in one piece from a plastic material having good insulating or dielectric properties, such as polyethylene, polypropylene, polystyrene or a vinyl polymer or copolymer. As shown most clearly in FIGS. 2, 4, 5 and 6, the plastic casing 15 is open at the top and has a pair of opposite side walls, a lower wall, and a front wall integrally connected together. The rear end of the plastic casing is closed by a terminal block 17 integrally connected to the casing body by a flexible hinge 18 extending between the lower end of the terminal block and the lower wall of the casing. Terminal prongs 20, 21, 22 and 23 made of conducting material, such as copper, brass or bronze, may be molded into the terminal block 17.

The arrangement of the terminal block 17 hingedly connected to the casing 15 simplifies the manufacture and assembly of the pickup. Thus, the casing and block 17 may be molded in one piece. Due to the fact that the casing and block are integrally connected together by the hinge, they may be handled and inventoried as one piece. The block may be left in open position as shown in FIG. 2 while the sub-assembly of core means, coils and pole pieces are inserted in the casing, thereby facilitating the assembly operation. Also, the leads from the coils may be connected to the terminal prongs while the block is in open position, after the parts have been assembled, and the electrical leads have thus been connected, the terminal block may then be closed simply by pressing it into the open end of the casing. In this connection, the inner edge portion of the terminal block is inwardly off-set, as shown and both the inner surface of the side walls of the casing and the off-set portion of the terminal block are rabbetted to retain the block in closed position. In addition, the terminal block may be held in closed position by heat sealing or by a solvent or adhesive.

The plastic casing 15 is subdivided by a transverse flange or wall 25 into forward and rear sections or compartments 26 and 27. The forward section 26 receives the sub-assembly of core, pole pieces, magnetic compensator and current generating coils. The terminal prongs 20 to 23 project into the rearward section or compartment and the connections with the leads of the coils are made in this section.

The replaceable moving system is received in and projects through a socket-like, slotted opening 28 which extends through the forward and lower wall of the plastic casing. In the forward section 26 of the plastic casing, the socket-like opening 28 opens into the interior of the casing. In the rear section, the lower wall of the plastic casing is thickened as shown at 29, so as to cover over the replaceable moving system.

The shielding casing 16 is made of a material having high magnetic permeability or low magnetic reluctance, such as soft iron, nickel or alloys thereof. It is provided with a pair of side walls, upper and lower walls and a front wall, and is of a size to snugly accommodate the plastic casing when the operating parts of the pickup are encased therein. It is provided with a small aperture 30 in its forward wall in registry with the socket-like opening 28 in the plastic casing when the parts are assembled together. Thus, the replaceable moving system may be inserted through the opening 30 into the socket-like opening 28. A clip 31 is suitably secured as by welding or brazing to the upper surface of the shielding casing as shown. This clip has screw receiving recesses 32 and serves for attaching the pickup to a tone arm of a phonograph turntable or record player.

As previously indicated, a sub-assembly containing the magnetic system and the current generator is disposed in the forward section or compartment 26 of the plastic casing. This sub-assembly is shown as a unit in FIG. 3 and the parts thereof are shown in the exploded view FIG. 2. It comprises the core 34 and the pole pieces 35a and 35b provided with apertures in their upper portions to accommodate the ends of the core. The core and pole pieces are made of a magnetic material of high permeability or low reluctance, such as soft iron, nickel or alloys thereof. The pole pieces extend downwardly and are provided with inwardly formed portions terminating with downwardly and angularly disposed portions. The permanent magnet of the moving system is adapted to be disposed between and spaced from the angularly disposed terminal portions of the pole pieces. The core and pole pieces along with the permanent magnet form the primary magnetic circuit and correspond to the pole pieces 1a and 1b and core 2 shown diagrammatically in FIG. 13.

Disposed around the core 34 adjacent the opposite end portions thereof are a pair of current generating coils 36a and 36b, which correspond to the coils 3a and 3b of the diagram. The leads of the coils are disposed on opposite sides thereof shown at 37, 38, 39 and 40, and the start leads may be identified by small tabs, as shown. These leads are suitably connected to the terminal prongs. Thus, as shown most clearly in FIG. 9, lead 37 is connected to terminal prong 20, lead 38 is connected to terminal prong 21, lead 39 is connected to terminal prong 22 and lead 40 is connected to terminal prong 23.

Also mounted on the core 34 intermediate the current generating coils 36a and 36b is the magnetic compensator 42 made of a magnetic material of high magnetic permeability and low reluctance, such as soft iron, nickel or alloys thereof. The magnetic compensator has an aperture extending therethrough as shown through which the magnetic core 34 extends. There is a tight friction fit between the magnetic core 34 and the magnetic compensator 42 so as to provide a good magnetic path through the core to the magnetic compensator. The magnetic core extends towards and is closely spaced from the permanent magnet of the moving system so as to thereby provide a good magnetic path between the core and permanent magnet.

The lower portion of the magnetic compensator preferably has grooves 43 extending at least part way around the magnetic compensator so as to receive the phase compensator 44 and help to frictionally hold it in place against accidental displacement. The phase compensator is in the form of a loop or coil formed into a closed circuit and is made of an electrically conducting, non-magnetic material such as copper, brass or bronze. I have found that a single turn or loop, as shown, will generally suffice.

Thus, the magnetic sub-assembly comprises the pole pieces 35a and 35b secured to opposite ends of the magnetic core 34 with the current generating coils 36a and 36b being mounted adjacent opposite ends thereof. The magnetic compensator is mounted on the core between the current generating coils and extends toward the moving system, so as to provide a magnetic path between the core and the permanent magnet. The phase compensator 44 is disposed around the magnetic compensator which compensates for the phase shift resulting when a load is imposed upon the circuit of the current generating coil of the active channel.

The magnetic and current generating sub-assembly is inserted in the forward section 26 of the plastic casing with the angularly disposed lower end portions of the pole pieces resting on the two sides of the slotted opening 28 in the lower wall of the casing. A ground strap 45 is extended between the magnetic circuit of the sub-assembly and the shielding casing 16 and this may be accomplished by securing the ground strap to the forward wall of the magnetic compensator and extending it upwardly and rearwardly at an angle. Thus when the shielding casing 16 is slid over the plastic casing with the sub-assembly therein, the upper end of the ground strap will engage the upper wall of the shielding casing. The ground strap should be made of a suitable electrically conducting, non-magnetic material which is resilient, such as copper, brass or bronze.

At the time that the sub-assembly is placed in the forward compartment of the plastic casing, the terminal block 17 is in open position, as shown in FIG. 2. The leads 37 to 40 of the current generating coils are then suitably connected to the inner ends of the terminal prongs 20 to 23 respectively in the manner heretofore explained. Thereafter, the terminal block 17 is pivoted upwardly into frictional engagement with the inner surface of the plastic casing so as to be frictionally held in place, and if desired it may be sealed as by means of a suitable bonding agent or by heat. Finally, the shielding casing is assembled with the plastic casing by sliding it over the plastic casing from the forward end thereof with the opening 30 in registry with the opening 28.

Figure 5:
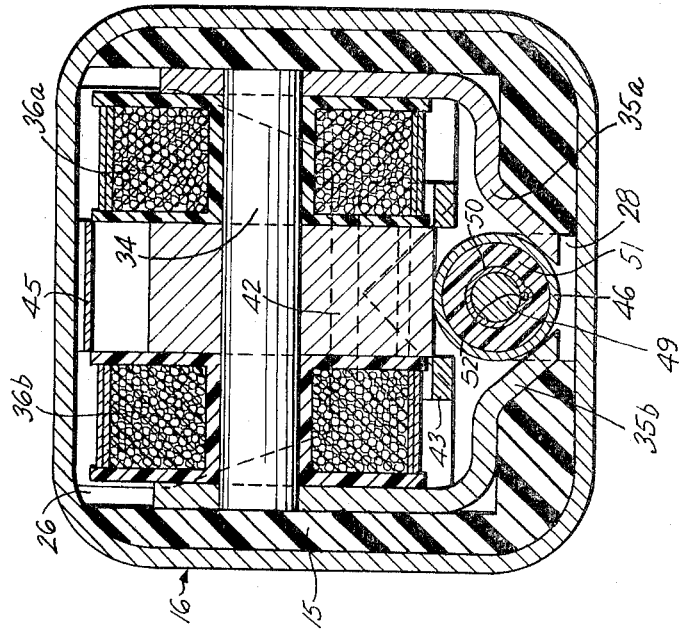
Figure 9:
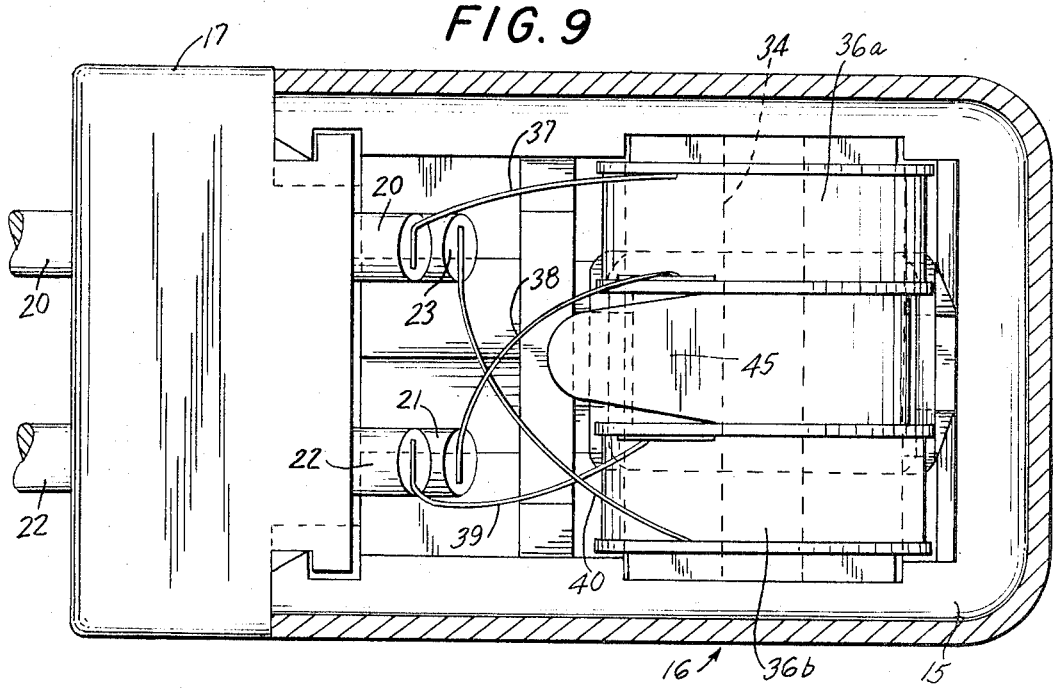
Figure 8:
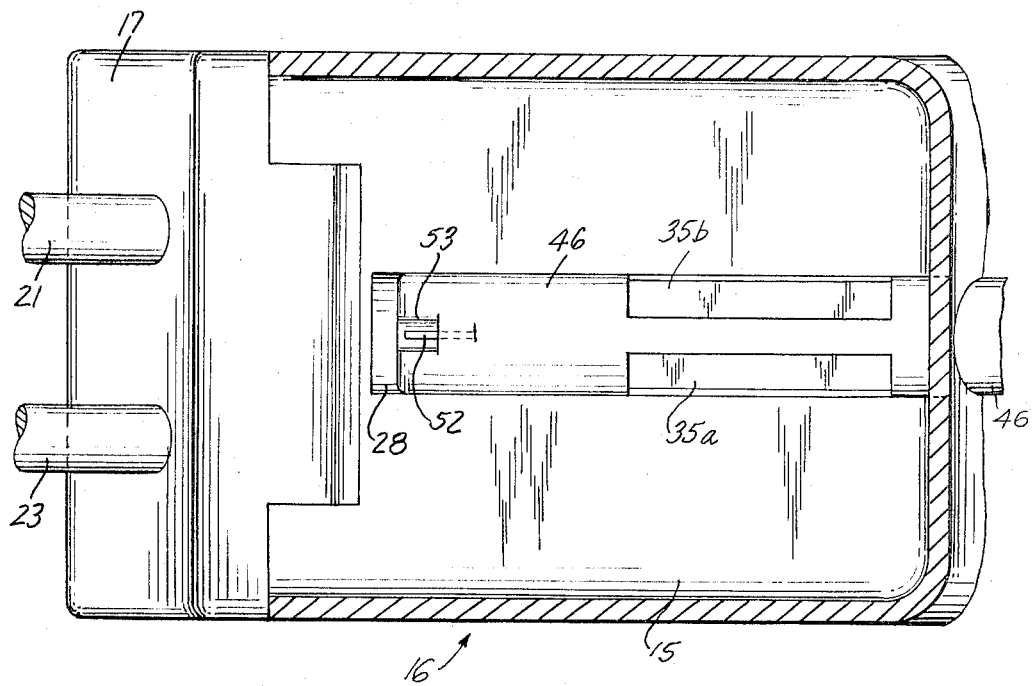

When the parts of the pickup cartridge are thus assembled, the moving system may be inserted through the opening 30 in the shielding casing into the socket-like opening 28 of the plastic casing, and the tubular casing of the moving system will then be disposed between the angularly disposed lower ends of the pole pieces and the lower end of the magnetic compensator and frictionally held thereby as shown most clearly in FIG. 5.

My improved moving system comprises a tubular casing 46 having a plastic or resin handle 47 mounted at the outer end thereof as shown. A record-engaging stylus 48, which may be made of a diamond or other hard jewel-like material, is suitably supported by supporting means disposed inside the housing or tubular casing 46 and projecting outwardly from the forward end thereof in a manner so that the stylus can engage the groove of the record and oscillate in response to the modulations of the two channel grooves thereof. The supporting means in the illustrated embodiment comprises a permanent magnet 49 connected by a tapered tube 50 of light, non-magnetic material, such as aluminum, to the stylus 48. A suitable spacer and damping device such as the collar 51 made of rubber, synthetic rubber or other flexible material having elasticity of a relatively low order is disposed around the permanent magnet and between the permanent magnet and the tubular casing so that the entire assembly of permanent magnet, aluminum tube and stylus can oscillate in response to modulations of the channels of the record groove.

The moving magnet and stylus are maintained in properly centered relationship between the pole pieces and are restored to properly centered position by means of the tie wire 52 made of a spring metal which is non-magnetic, such as copper, bronze, brass, beryllium copper, or the like. The tie wire extends between the tubular housing or casing 46 and the permanent magnet 49. Thus, the rear or inner end of the tie wire may be extended beneath a slotted clip 53 formed integrally with the inner end of the tubular housing and from thence it may extend forwardly between the aluminum tubing 50 and the permanent magnet 49. The leading end of the tie wire may be embedded in a plastic or resin filler provided inside the aluminum tubing 50 or it may be suitably secured directly to the permanent magnet. The tie wire may be disposed either above or below the permanent magnet. I prefer to position the tie wire beneath the permanent magnet as this results in improved tracking and low distortion characteristics, and also in a lowered effective cartridge reproduction angle with regard to the record surface.

The permanent magnet should be of high strength and high flux density and to this end should preferably be made of an alloy of iron and nickel, particularly alloys containing iron, cobalt, nickel, aluminum and copper, such as those known as Alnico, having a high coercive force.

The clearance between the housing and the assembly of permanent magnet, aluminum tubing and stylus should be such that the moving system is free to oscillate in response to the modulations of the channels of the record groove without contacting or engaging the housing. The surface of the housing may be dimpled, as shown at 54, so as to properly position the moving system. The tie wire assembly helps not only to restore the stylus assembly to its properly centered position, it also helps to retain the stylus in its proper upright position. The housing 46 is of such a diameter as previously pointed out that it has a snug frictional fit in the socket 28 between the pole pieces 35a and 35b and the magnetic compensator 42, as most clearly shown in FIGS. 4 and 5. This helps to properly orient and position the moving system with respect to the pole pieces and magnetic compensator. The plastic handle portion 47 is also formed so as to engage surfaces of the casing and to further orient and position the moving system with respect to the pole pieces. Thus, as shown in FIGS. 1, 2 and 4, the plastic handle may be secured to the outwardly flaired forward end of the tubular casing 46 and extend upwardly therefrom at the same angle as the forward wall of the shielding casing. The rear surface of the plastic handle engages the front surface of the shielding casing when the moving system is fully installed. In addition, the upper end of the plastic handle is provided with a rearwardly extending hooked portion which overlaps the forward upper surface of the shielding casing to further orient the moving system and maintain the stylus in its appropriate upright position.

In FIG. 12A I have shown a modified form of plastic handle 47a which engages the front wall of the shielding casing but instead of extending over the top in hooked relationship, extends laterally across the full width of the forward wall of the casing and is provided with two hooked portions overlapping the side walls of the casing.

In either arrangement, the interengagement between the rear wall of the plastic handle and the front wall of the casing and the hooked overlapping of at least one of the other walls serves to properly orient and position the moving system.

In both forms of handes 47 and 47a, the lower surface thereof is provided with an appropriate recess 55 communicating with the interior of the tubular housing 46 and the moving system and stylus projects outwardly therethrough with the lower end of the stylus 48 projecting beneath the lower surface of the two sides of the recess 55 whereby the stylus may engage a groove of a record. However, due to the resilient mounting of the moving system when the stylus is subjected to impact, as when the tone arm is dropped on a record, the moving system will move up into the recess 55 protecting the record from damage so that the main impact is between the lower portion of the plastic handle and the record. The forward wall of the plastic handles 47 and 47a are also provided with longitudinal recesses as shown at 56, extending from the top of the handle to the recess 55. The forward end of the moving system is positioned beneath the recess 56 so that it can be "sighted" from the top of the pickup cartridge and properly aligned with a record groove.

When the entire replaceable moving system has been inserted in the pickup cartridge, the permanent magnet is positioned between the pole pieces 35a and 35b so that when one pole or end of the magnet moves toward one of the pole pieces, the opposite end will move toward the compensator and vice versa.

The pickup cartridge shown in FIGS. 1 through 12A operates in the same manner as the device diagrammatically shown in FIG. 13. Thus, as the magnet and stylus assembly are oscillated in response to the modulations of channel A of the record groove, the poles of the magnet move toward and away from the angular lower end of the pole piece 35a. As a result, a magneto-motive force and flux is established across the current generating coil 36a causing a current to be generated in the coil thereof and the circuit to which it is connected.

Due to the provision of the magnetic compensator 42, there is no change in the magneto-motive force or flux across coil 36b with the result that no current is generated therein.

When a load in the form of a pre-amplifier or amplifier is connected to the coil 36a of the active channel, there is a phase shift which is fed back to the magneto-motive force or flux in the magnetic circuit thereby interfering with the compensation of the circuit. Phase compensator 44 compensates for this phase shift and prevents or minimizes cross-talk. I have previously indicated that the phase compensator 44 should be in the form of a coil or loop made of an electrically-conducting, non-magnetic material and having a closed circuit. To prevent or minimize cross-talk, the impedance triangle of the phase compensator should be similar in a geometric sense to the impedance triangle of the load circuit. In a circuit having resistance and inductance, the impedance triangle is a right-angled triangle in which the base is determined by the resistance in ohms and the altitude is determined by the formula $2\pi FL$, where F is the frequency in cycles per second, and L is the inductance in henrys. The angle between the hypotenuse and the base of the triangle represents the phase shift.

When the stylus and magnet assembly are caused to oscillate in response to the modulations of channel B of the record groove, the poles of the magnet move toward and away from the depending angular end of the pole pieces $35b$, thus causing an electro-motive force or flux across current generating coil $36b$ with the result that a current is generated in the coil and in the circuit thereof. The magnetic compensator 42 and phase compensator 44 operate in a similar manner to prevent or minimize crosstalk in coil $36a$.

In using the pickup disclosed in FIGS. 1 to 12A, it is assembled in the manner previously described and it is attached to a tone arm by screws or other fasteners extending through the slots 32 of clip 31. As indicated most clearly in FIG. 11, a ground strap 58 is connected between terminal 22 and the shielding casing. The "hot" lead of the channel A amplifier system is connected to terminal prong 21 and the shielded or ground lead of channel A is connected to terminal prong 20. The hot lead of the channel B amplifier system is connected to terminal prong 23 and the shielded or ground lead is connected to terminal prong 22. When thus connected, the stereophonic cartridge can be used in the usual manner with the stylus in engagement with the record groove of a stereophonic record to produce a stereophonic output having high fidelity and response characteristics with a clear demarcation between the channels.

The pickup cartridge heretofore described is of the socalled one-sided type, in which the pickup is designed for playing records disposed on one side only of the cartridge. My invention is also applicable to stereophonic magnetic pickups embodying the advantages of my invention which can play records disposed on opposite sides thereof. In FIGS. 14 to 19, I have shown a double-sided pickup cartridge embodying the advantages of my invention and employing only a single pair of current generating coils which may be actuated by moving systems disposed on either side of the cartridge.

The cartridge is provided with an inner plastic or resin casing and an outer shielding casing. The inner casing is made of a plastic or resin material having good dielectric properties, such as phenyl formaldehyde resin, or a relatively hard polystyrene, polyethylene, polypropylene, or polyvinyl resin. The plastic casing 60 is made of two similar halves, $60a$ and $60b$, which are mirror-images of each other so that a description of one will suffice for the other. The parting line between the two half-casing sections extends along the center of the casing. Each casing half is provided with a forward compartment or section 61 in which the sub-assembly of the magnetic circuit and current generating means is disposed. The sections also have a rear compartment 62 into which the terminal prongs extend and in which the connections to the terminal prongs are made. A slot 63 through which the leads from the coils are extended connect the forward and rear compartments. Terminal prongs 64, 65 and 66 and 67 extend into the rear compartment of the respective sections from the rear exterior of the casing. Each casing section is also provided with a socket opening 68 and a socket groove 69 facing in a forward direction at one surface of the casing for receiving one of the moving systems. On the opposite surface, each section is formed with a rearwardly facing socket opening 70 communicating with a socket groove 71 for receiving the other moving system. When the magnetic and current generating sub-assembly, hereinafter described, has been assembled and inserted in the forward compartment of the sections and when the leads of the current generating coils have been connected to the terminal prongs 64 to 67, the two casing sections are then placed in contact with each other along their parting line. They may be secured in assembled relationship by means of a bonding agent or by heat. Or, they may be simply held in assembled relationship by the outer shielding casing 72 formed in two similar halves $72a$ and $72b$.

The shielding casing in this form of my invention, as in the first form, is made of a suitable magnetic material having high magnetic permeability, such as soft iron or nickel or alloys thereof. It will be seen that the two sections are of identical construction, but are disposed in oppositely facing relationship. One being disposed on one surface of the sections and facing forwardly, and the other being disposed on the opposite side of the casing and facing rearwardly. Each section is of generally channel shaped configuration having a pair of side walls which frictionally and resiliently engage the outer surfaces of the two plastic casing sections when assembled therewith so as to retain them in assembled relationship. The shielding casing sections also have a connecting outer wall of stepped configuration with an intermediate angularly disposed portion 73 adapted to engage a surface of the plastic casing sections of similar configuration. The angularly disposed portions 73 each have an aperture therein adapted to register with the socket openings 68 and 70, respectively, in the plastic casing. Thus, the tubular housing of the moving systems may be inserted through the apertures in the shielding casing sections into the socket openings in the plastic casing.

When the shielding casing sections are placed over the assembled plastic casing sections, they serve as clips and retain them in assembled relationship. If desired, in addition to the shielding casing sections, the plastic casing sections may be held together by a bonding agent or by being heat sealed.

The magnetic and current generating sub-assembly in the double-sided form of device is similar to that shown in the diagram (FIG. 13) and in the first form of my invention, with the exception that the pole pieces and magnetic compensator extend outwardly in both directions to opposite sides of the cartridge. The pole pieces provide two pairs of spaces poles forming gaps on opposite sides of the cartridge and each is provided with a separate, replaceable moving system. The same current generating coils generate the output from both of the moving systems.

Thus, referring primarily to FIGS. 15, 16 and 17, I have provided a single core 75 around which the two current generating coils $76a$ and $76b$ are mounted, adjacent opposite ends thereof. The two pole pieces $74a$ and $74b$ are provided with apertures and engage the opposite ends of the core. The pole pieces are mounted on the core adjacent their center portions and project outwardly towards opposite sides of the cartridge terminating in angularly disposed poles $74a1$, $74a2$ and $74b1$ and $74b2$. Thus, the poles $74a1$ and $74b1$ form a gap on one side of the cartridge, and the poles $74a2$ and $74b2$ form a gap on the opposite side of the cartridge.

Mounted on the core intermediate the current generating coils is the magnetic compensator 82 which extends in opposite directions from the core towards the respective gaps and moving systems disposed therein. The core pole pieces and compensator are all made of material having high magnetic permeability or low reluctance, such as soft iron, nickel or alloys thereof. Disposed around the magnetic compensator adjacent the opposite ends thereof are the phase compensators 83 and 84, which are generally similar to the phase compensators in the first form of my invention, each being in the form of a closed loop made of an electrically conducting, nonmagnetic material, such as copper, bronze or brass. The phase compensators serve the same function as in the the first form of my invention, namely to compensate for phase shifts resulting when a load in the form of a preamplifier or amplifier is connected to the coil of the active channel. As previously indicated, the impedance triangle of the phase compensators should be similar in a geometric sense to the impedance triangle of the load circuit.

The magnetic compensator serves the same function with respect to each side of the magnetic circuit, namely it prevents a magneto-motive force or flux from flowing across the current generating coil of the inactive channel to thereby prevent or minimize cross-talk.

The current generating coil 76a has two leads 77 and 78 which extend through the channel 63 to the rear compartment 62 where they are suitably connected to the terminal portions 64 and 65. The current generating coil 76b has two leads 79 and 80 which similarly extend through channel 63 to compartment 62 where they are connected to terminal prongs 66 and 67.

The double-sided form of my cartridge has two moving systems 85 and 85' of identical construction which can be engaged through the socket openings 68 and 70 at opposite sides of the cartridge and into the gaps so that the permanent magnets of the moving system are in inductive relationship with the ends of the pole pieces. The moving system 85 in inserted from the front of the cartridge into the socket opening 68 and the moving system 85' is inserted from the rear portion of the cartridge into the socket opening 70.

Each moving system comprises a tubular housing 86 made of non-magnetic material, such as copper, brass, bronze or aluminum and has a plastic handle 87 mounted at the outer end thereof. The plastic handle is provided with a surface engaging the surface of the cartridge when the moving system is fully inserted, which conforms with the stepped outer surface of the shielding casting sections 72a and 72b, thus helping to properly position and orient the stylus and moving system with respect to the pole pieces and the record surface.

The moving system also includes a stylus 88 which projects outwardly through an opening or recess provided at the outer surface of the plastic handle so that the stylus may engage a record groove. The stylus may be made of diamond or other suitable hard jewel-like material. It is connected to the permanent magnet 89 similar to the permanent magnet in the first form of my invention so as to oscillate as a unit therewith by means of a tube 90 made of light, non-magnetic material, such as aluminum. The moving system is mounted within the tubular housing 86 by means of the collar 91 interposed between the moving system and the tubular housing and made of rubber, synthetic rubber, or some other elastomeric material and serving as a spacer and a damping device.

A tie wire 92 extending between a clip 39 formed in the inner end of the tubular housing 86 and the forward end of the magnet and serves to properly center the moving system with respect to the pole pieces and to restore them to centered position. The tie wire also serves to help maintain the stylus in proper upright position. As indicated, the tie wire may extend between the aluminum tubing 90 and the permanent magnet at the forward end of the magnet so as to be retained in place. As in the first form of my invention, the tie wire is preferably made of a suitable non-magnetic material, such as beryllium, copper or bronze.

As previously indicated, the moving system 85 is inserted into the socket opening 68 from the forward end of the cartridge and the moving system 85' is inserted into the socket opening 70 from the rear portion of the cartridge. When they are fully inserted, the surfaces of the plastic handles 87 engage the complementary outer surfaces of the shielding sections 72a and 72b, as most clearly shown in FIG. 17. In that position, the permanent magnets are properly positioned between the opposite ends of the pole pieces and the styli project outwardly from the recess-like openings in the plastic handles in proper position to engage the grooves of a record. The styli on the respective sides of the cartridge may have different radii so as to engage different types of record grooves in records adopted to be operated at different speeds or they may both have the same type of styli.

Under any circumstances, it will be appreciated that the styli on the opposite sides of the cartridge are not simultaneously engaged with two records, but are simply used alternatively to play a single record at a time.

The double-sided form of stereophonic cartridge may be suitably grounded to minimize or eliminate hum. The cartridge may be connected to a stereophonic amplifier system by connecting the terminals 64 and 65 to the leads of one channel and the terminal portions 66 and 67 to the leads of the other channel. Each side of the cartridge is used in a manner similar to that in which my first form of cartridge is employed. Each side also operates and functions in the same manner as previously described in connection with the first form of my invention.

It will be seen that the same controls over the magnetic system are provided in this form of my invention. Thus, I provide a magnetic compensator and phase compensators and the shielding casing extends into inductive relationship in respect to the pole pieces. Further controls can be obtained by varying the angles of the end portions of the pole pieces and by varying the configuration of the respective ends of the compensator.

In both of the illustrated forms of cartridges, it will be appreciated that moving systems may be readily removed and replaced with other moving systems when the styli are damaged or worn. It will also be appreciated that a moving system having a stylus with one type of radius may be replaced with a moving system having a stylus with a different radius. The plastic handle portions may be color coded to indicate the different types of styli.

It will thus be seen that I have provided an improved magnetic phonograph pickup of the stereophonic type having a minimum number of parts which may be readily assembled together thereby reducing the bulk and mass of the pickup and the cost of manufacture. It will also be seen that my improved pickup provides high fidelity and response characteristics and a high degree of control over the demarcation between the active and quiet channels to thereby substantially eliminate or minimize cross-talk between the channels.

From the several embodiments of my invention illustrated and described herein, it will be appreciated that modifications may be made without departing from my invention as set forth in the accompanying claims.

I claim:

1. A stereophonic phonograph pickup of the magnetic type comprising: a supporting structure; means made of magnetic material supported on said supporting structure and providing a magnetic circuit and including core means and a pair of pole pieces connected to respectively opposite end portions of the core means; a pair of current generating means including a pair of coils mounted on said core means in spaced relationship; a moving system including a record engaging stylus and means including a magnetic member for supporting the stylus and mounted in equally spaced relationship between the pole pieces for oscillatory movement so that a pole of the magnetic member can move in paths towards and away from the respective pole pieces; a magnetic compensator made of magnetic material extending from said core means intermediate said coils towards said magnetic member of the moving system providing a magnetic path of low reluctance between the core means and the magnetic member; and a phase compensator in the form of a coil of non-magnetic material disposed around the magnetic compensator.

2. A stereophonic phonograph pickup of the magnetic type as set forth in claim 1 in which a shielding made of material of high magnetic permeability is provided around the pickup and extends into inductive relationship with the pole pieces.

3. A stereophonic phonograph pickup of the magnetic type as set forth in claim 1 in which the pickup has a socket-like opening extending between the pole pieces for removably accommodating the moving system and the moving system is provided with a tubular casing removably received in the socket-like opening and provided with an elongated plastic handle at its outer end which engages surfaces of the pickup to properly orient the magnet with respect to the pole pieces and the stylus with respect to the record surface, said plastic head having a recess in its lower surface through which the stylus normally projects so as to be engageable with the groove in the record but which is large enough to accommodate the stylus when it is subjected to an impact and the forward edge of said plastic handle is provided with a groove extending from the upper surface of the handle to the recess with the stylus projecting beneath the groove whereby it can be readily aligned with a record groove.

4. A stereophonic phonograph pickup of the magnetic type as set forth in claim 1 in which the core means is in the form of a rod of magnetic material and a sub-assembly is formed of the core, the two coils assembled therearound, the pole pieces connected to the end portions of the core, and the magnetic compensator connected to the central portion of the core.

5. A stereophonic phonograph pickup of the magnetic type as set forth in claim 4 in which the said sub-assembly is disposed in a plastic casing open at the top and having two opposite side walls, a lower wall and a front wall with the rear wall being formed by a terminal block hingedly connected to the casing along its lower edge and being secured in closed relationship with respect to the casing, said lower wall being provided with a slotted opening, through which the moving system projects.

6. A stereophonic phonograph pickup of the magnetic type for use with two channel stereophonic record discs of the type having a sound groove with first and second sound modulated side surfaces disposed at an angle to each other and representing the first and second sound channels, said pickup comprising: a supporting structure; means made of magnetic material supported on said supporting structure and providing a magnetic circuit and including a core means having two end portions, a first channel pole piece connected to the first end portion of the core means and a second channel pole piece spaced from the first channel pole piece and connected to the second end portion of the core means; current generating means including a first channel current generating coil mounted on the core means adjacent the first end portion and a second channel current generating coil mounted on the core means adjacent the second end portion; a moving system including a stylus for engaging the record groove and means including a permanent magnet for supporting the stylus and mounted in equally spaced relationship between the pole pieces for oscillatory movement so that a pole of the magnet is caused to move in a path towards and away from the first channel pole piece in response to modulations of the first channel side wall of the record groove to cause a magneto-motive force across the first channel current generating coil and so that the pole of the magnet moves in a path towards and away from the second channel pole piece in response to modulations of the second channel side wall of the record groove to cause a magneto-motive force across the second channel current generating coil; a magnetic compensator made of magnetic material extending from said core means towards said permanent magnet of the moving system providing a magnetic path of low reluctance between the core means and the permanent magnet so as to prevent a magneto-motive force across the second channel current generating coil in response to movements of the pole of the permanent magnet in a path towards and away from the first pole piece and to prevent a magneto-motive force across the first channel current generating coil in response to movements of the pole of the permanent magnet in a path towards and away from the second channel pole piece; and a phase compensator in the form of a closed circuit coil made of electrically conducting, non-magnetic material, disposed around the magnetic compensator to compensate for phase shifts resulting from a load imposed on the circuit generating coil of the active channel.

7. A stereophonic phonograph pickup of the magnetic type as set forth in claim 6 in which the pickup is designed and rated for connecting the current generating coils into load circuits having predetermined resistance characteristics and presenting a predetermined impedance triangle and the phase compensator has resistance and inductance characteristics presenting an impedance triangle geometrically similar to the predetermined impedance triangle of said load circuit.

8. A stereophonic phonograph pickup of the magnetic type as set forth in claim 6 in which shielding made of magnetically permeable material is disposed around the pickup with portions extending into inductive relationship with the pole pieces.

9. A strereophonic phonograph pickup of the magnetic type as set forth in claim 6 in which the pickup is provided with a casing and with a socket-like opening extending through the casing between the pole piece to removably accommodate the moving system, and the moving system is provided with a tubular casing removably engageable in said socket-like opening and having an enlarged plastic head at its outer end engageable with surfaces of the casing to orient the permanent magnet with respect to the pole piece and the stylus with respect to the record surface, said enlarged plastic handle having a recess along its lower surface from which the stylus normally projects but which is large enough to accommodate the stylus when it is subjected to impact and the forward surface of said handle is provided with a groove extending from the top of the recess with the stylus being disposed beneath the groove whereby it can be readily oriented with the groove of a record.

10. A stereophonic phonograph pickup of the magnetic type as set forth in claim 6 having a phase compensator in the form of a single loop of non-magnetic electrically conducting metal disposed around the magnetic compensator to compensate for phase shifts resulting from a load imposed on the current generating coil of the active channel.

11. A stereophonic phonograph pickup of the magnetic type as set forth in claim 6 in which the core means is in the form of a rod of magnetic material and a sub-assembly is formed of the core, the two coils assembled therearound, the pole pieces connected to the end portions of the core and magnetic compensator connected to an intermediate portion thereof.

12. A strereophonic phonograph pickup of the magnetic type as set forth in claim 11 in which the sub-assembly is disposed in a plastic casing open at the top and having opposite side walls, a lower wall and a front wall with the back end of the casing being closed by a terminal block hingedly secured at its lower edge to the lower wall of the casing and being secured in closed position with the front and bottom walls of the casing being formed with a groove-like opening through which the moving system extends.

13. A two-sided stereophonic phonograph pickup of the magnetic type for use with two-channel stereophonic record discs of the type having a sound groove with first and second sound modulated side surfaces disposed at an angle to each other and representing the first and second sound channels, said pickup comprising: a supporting structure, means made of a magnetic material supported on said supporting structure and providing a magnetic circuit and including a core means having two end portions, a first channel pole piece connected to the first end portion of the core means and extending therefrom in opposite directions and terminating in a pole at each end and a second channel pole piece connected to the second end portion of the core means and spaced from the first channel pole piece and terminating in a pole piece at each end with the poles of the respective pole pieces being spaced from each other and providing two gaps arranged respectively at opposite sides of the pickup; current generating means including a first channel current generating coil mounted on the core means adjacent the first end portion and a second channel current generating coil mounted on the core means adjacent the second end portion; a pair of moving systems for the respective gaps and each including a stylus for engaging the record groove and means including a permanent magnet for supporting the stylus with the permanent magnets of the respective moving systems being mounted between the poles of the pole pieces on respectively opposite sides of the pickup for oscillatory movement so that a pole of the magnet is caused to move in a path towards and away from the first channel pole pieces in response to modulations of the first channel side wall of the record groove to cause a magneto-motive force across the first channel current generating coil and so that the pole of the magnet moves in a path towards and away from the second channel pole piece in response to modulations of the second channel side wall of the record groove to cause a magneto-motive force across the second channel current generating coil; a magnetic compensator made of magnetic material extending in opposite directions from said core means towards said permanent magnets of the respective moving systems providing a magnetic path of low reluctance between the core means and the respective permanent magnets so as to prevent a magneto-motive force across the second channel current generating coil in response to movements of the poles of the permanent magnets in a path towards and away from the first pole piece and to prevent a magneto-motive force across the first channel current generating coil in response to movements of the poles of the permanent magnets in a path towards and away from the second channel pole piece; and a pair of phase compensators in the form of closed circuit coils made of electrically conducting, non-magnetic material disposed around the magnetic compensator adjacent respectively opposite ends thereof to compensate for phase shifts resulting from a load imposed on the current generating coil of the active channel.

14. A replaceable moving system for a stereophonic phonograph pickup of the magnetic type comprising: a tubular casing of non-magnetic material, a record engaging stylus projecting outwardly from said tubular casing and having supporting means including a permanent magnet mounted in said casing for oscillatory movement, and an enlarged plastic handle mounted at one end of said tubular casing and having a recess formed in its lower surface from which the stylus normally projects but which is large enough to accommodate the stylus when it is subjected to an impact, the forward edge of said plastic handle being formed with a groove extending from its upper surface to the recess with the stylus being disposed beneath the groove in alignment therewith, whereby the stylus can be sighted through the groove and readily aligned with the groove of a record, said plastic handle having exterior surfaces including the rear surface thereof serving to engage the pickup and orient the moving system with respect to the pickup and the record surface.

References Cited by the Examiner
UNITED STATES PATENTS 2,093,540 9/1937 Blumlein _____ 179—100.41
3,146,319 8/1964 Stanton _____ 179—100.41

BERNARD KONICK, *Primary Examiner.*

IRVING L. SRAGOW, R. J. GARBACIK, A. I. NEUSTADT, *Assistant Examiners.*